No. 853,248. PATENTED MAY 14, 1907.
J. G. LOHNER.
BRAKE LEVER.
APPLICATION FILED SEPT. 1, 1906.

Witnesses
T. P. Britt
K. G. Whitcomb

Inventor
J. G. Lohner
By Swift & Co.
Attorneys ic
UNITED STATES PATENT OFFICE.

JOHN G. LOHNER, OF SPARKS, OKLAHOMA TERRITORY.

BRAKE-LEVER.

No. 853,248.

Specification of Letters Patent.

Patented May 14, 1907.

Application filed September 1, 1906. Serial No. 332,923.

*To all whom it may concern:*

Be it known that I, JOHN G. LOHNER, a citizen of the United States, residing at Sparks, in the county of Lincoln and Territory of Oklahoma, have invented a new and useful Vehicle-Brake; and I do hereby declare the following to be a full, clear, and exact description of the invention, such as will enable others skilled in the art to which it appertains to make and use the same.

The invention relates to brakes, more especially for wagons, but which may be applied to various kinds of vehicles.

The object of the invention is to provide a simple durable and inexpensive device of this character, which can be readily operated.

With these and other objects in view, the invention consists in the novel construction and arrangement of parts hereinafter described and shown and particularly pointed out in the appended claims.

Figure 1:
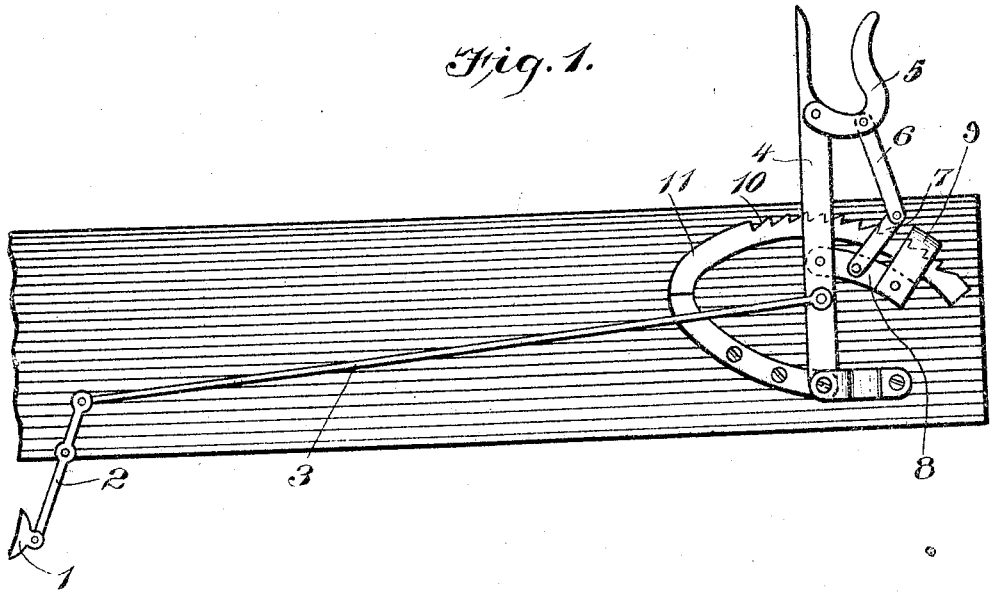
Figure 2:
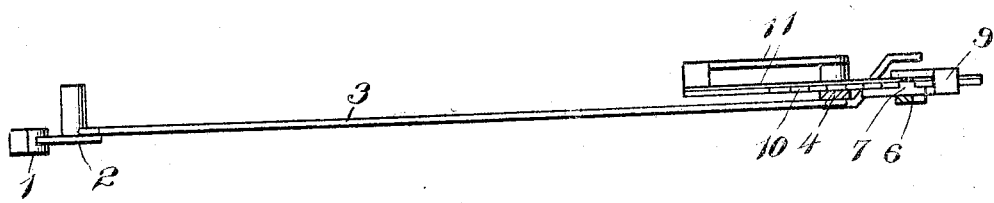
Figure 3:
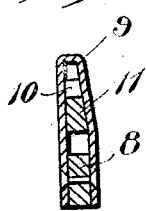

In the drawings forming part of this specification, and in which like numerals of reference indicate corresponding parts, Figure 1 is a side elevation of the brake constructed in accordance with this invention. Fig. 2 is a top plan view, the upper part of the main lever being removed. Fig. 3 is a sectional view, taken through the sleeve 9.

Referring to the drawings, 1 designates a brake-shoe mounted on a lever 2, on the side of a vehicle body, having a connecting rod 3, secured to the main lever 4. The lever 4 which actuates the brake is pivotally mounted on the side of the vehicle body and extends upward to a point where it can be conveniently grasped by the hand of the driver. On the upper part of the lever 4, is mounted a bell crank lever 5, which has a link 6, which connects it with a dog 7, the lower part of the dog 7, being connected with a bar 8, which is connected with the main lever and with a sleeve 9. The bar 8 which is rigidly held in position by the sleeve 9, serves to guide the main lever 4 and a dog 7 when the same are oscillated.

When it is desired to apply the brakes, the lever 4 is pushed forward and the dog 7 engages ratchet teeth 10, of a suitable bar 11 secured to the side of the wagon; when it is desired to release the brakes, the handle of the bell crank lever is pressed inward, which releases the dog from the ratchet teeth, thereby permitting the main lever to move inwardly.

What I claim is:

A vehicle brake, having a main lever adapted to actuate a brake-shoe, a ratchet bar, a sleeve mounted thereon, and having a bar 8, connecting it with said lever, a dog mounted on said bar 8, a bell crank lever mounted on the upper part of said lever, and a link connecting said dog with said bell crank lever, substantially as described.

In testimony whereof I have signed my name to this specification in the presence of two subscribing witnesses.

JOHN G. LOHNER.

Witnesses:
FRED RICHARDSON,
D. W. HALEY.